Sept. 22, 1936.   F. C. WAPPLER ET AL   2,055,188
FLUOROSCOPE
Filed April 9, 1934
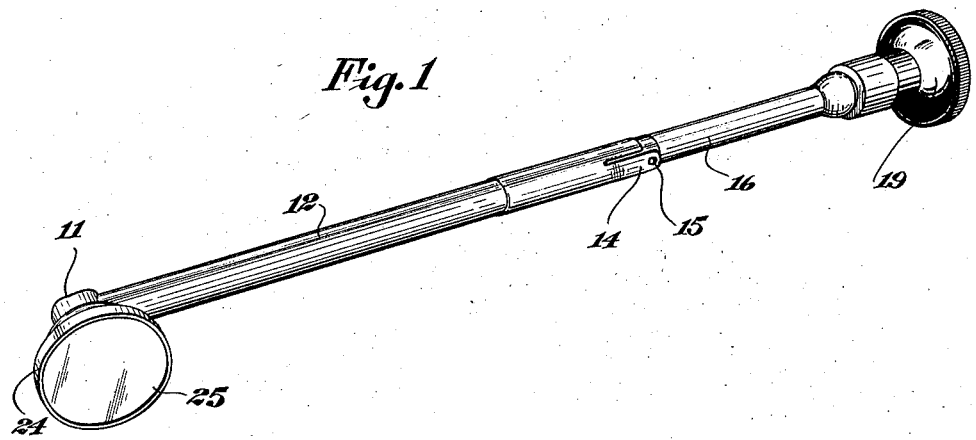
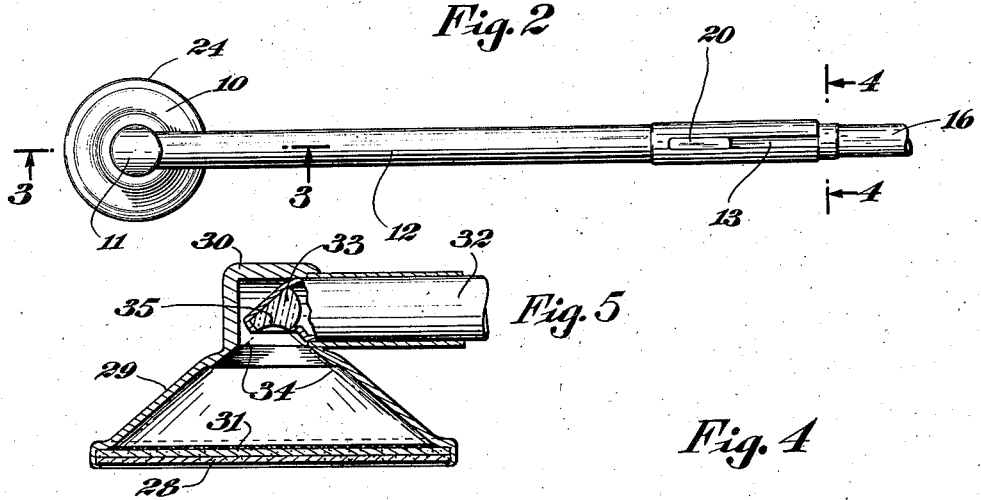
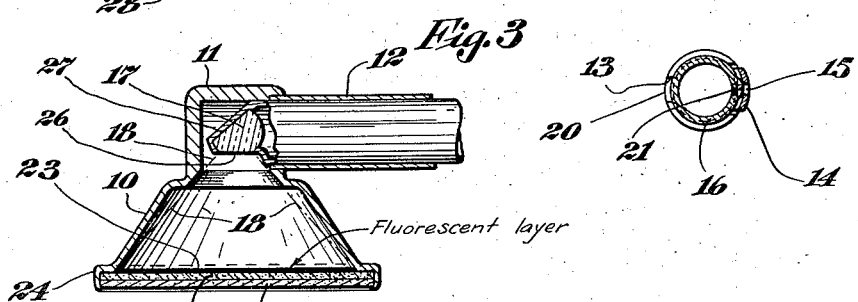
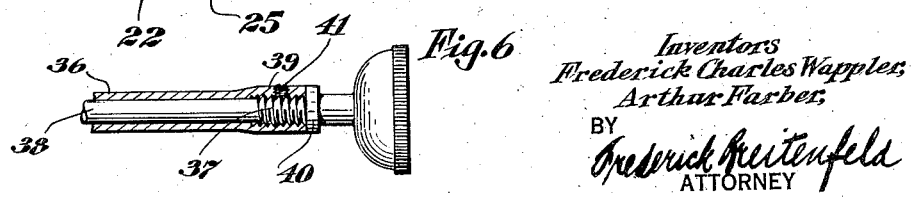
Inventors
Frederick Charles Wappler,
Arthur Farber,
BY
Frederick Breitenfeld
ATTORNEY Patented Sept. 22, 1936

2,055,188

UNITED STATES PATENT OFFICE 2,055,188

FLUOROSCOPE

Frederick Charles Wappler, New York, N. Y., and Arthur Farber, Newark, N. J., assignors to American Cystoscope Makers, Inc., New York, N. Y., a corporation of New York Application April 9, 1934, Serial No. 719,662

7 Claims. (Cl. 250—34)

Our present invention relates generally to X-ray apparatus, and has particular reference to fluoroscopes.

It is a general object of our invention to provide a fluoroscopic device of unique structure and capability, enabling an operator to view the shadows produced by X-rays passing through relatively small and inaccessible portions of the body. While our invention is by no means restricted to any specific purpose or for use with any particular portion of the body, its general nature and advantages will be clearly appreciated when we point out that it is admirably adapted for fluoroscopically examining the teeth, an accomplishment that has never heretofore, to our knowledge, been successfully achieved in a practical manner.

Briefly, our invention consists in providing a light-tight chamber of special construction and provided with a window pervious to X-rays, in combination with a particular type of optical means for transmitting a rear view of the window to a relatively remote, and preferably lateral, point of observation. In all previous attempts along these lines, so far as we are aware, recourse has always been had to the reflecting properties of mirrors, and we are aware of prior endeavors in which a rear view of a fluorescent screen is sought to be reflected along a laterally disposed sight tube. Such constructions are utterly impractical, however, because of the necessarily bulky nature of the resultant instrument. Our present instrument, on the other hand, is characterized by a structural and optical arrangement which permits a fluorescent screen to be feasibly positioned into relatively small and cramped quarters. For example, our present instrument is of practical utility in fluoroscopically examining any selected tooth or group of teeth, an accomplishment which requires a fluoroscopic screen to be feasibly inserted, in a variety of positions, within the mouth cavity.

It is a feature of our invention to provide a light-tight chamber which is of substantially conical configuration. The chamber has a relatively large front wall which constitutes a window pervious to X-rays, and is provided with side walls which converge rearwardly. Within the rear narrow end of the chamber we arrange a special type of optical means which commands a forwardly divergent, substantially conical field of vision, thereby commanding a rear view of a fluorescent screen positioned behind said window. The optical means is adapted to transmit such view to a remote point of observation.

The optical device which we prefer to employ is a surgical telescope or telescopic tube of relatively small calibre well known per se in the surgical instrument art, whose objective lies approximately at the apex of the conical field of vision which it commands. Wherever the term "telescope" is used herein and in the appended claims, it is intended to refer to an instrumentality of this type.

In one form of our invention, the arrangement is such that the optical means and the screen are capable of separable association. In another embodiment, the telescope and the light-tight chamber are in permanent association. In both cases, the instrument, or the parts thereof, are capable of sterilization.

We achieve the foregoing objects, and such other objects as may hereinafter appear or be pointed out, in the manner illustratively exemplified in the accompanying drawing, wherein—

Figure 1 is a perspective view of an instrument of the present character;

Figure 2 is a fragmentary plan view of the same;

Figure 3 is an enlarged cross-section taken substantially along the line 3—3 of Figure 2;

Figure 4 is a cross-sectional view taken substantially along the line 4—4 of Figure 2;

Figure 5 is a view similar to Figure 3, illustrating a modification; and

Figure 6 is a fragmentary longitudinal cross-section through the rear portion of a modified construction.

Referring to Figures 1–4, the light-tight chamber 10 may be composed of metal or other suitable material, and is substantially in the form of a conical frustum. It will be observed that the forward wall is of relatively large area, while the side walls converge rearwardly and terminate in a sort of housing 11 of relatively small size. Extending laterally from the housing 11 is a sheath 12 whose rear end, in the form of Figures 1–4, is preferably provided with the longitudinal slot 13 and with the resilient tab or finger 14 having a hole 15 therein.

The optical means of the present invention consists of a telescopic tube of the character designated by the reference numeral 16, this tube being adapted to be snugly accommodated within the sheath 12 so that the objective 17 will position itself within the housing 11. The objective is preferably in the form of a hemispherical lens having a flattened exposed portion 26, whereby the flat side 27 of the hemisphere serves as a reflecting surface. A lens of this character is characterized by its ability to command a substantially conical field of vision, the apex of the cone lying substantially within the body of the lens 17. This field of vision is approximately designated by the reference numeral 18, and it will be observed that the chamber 10 is constructed in substantial conformity with the lateral bounds of this field of vision.

At the rear end the telescopic tube 16 is provided with the usual eyepiece 19 constituting a remote point of observation with respect to the chamber 10. Near the rear end of the tube 16 the latter is preferably provided with the projection 20, adapted to fit slidably into the slot 13, and with the rounded projection or bump 21, adapted to snap into engagement with the hole 15 when the telescope is pushed forwardly to its maximum extent. The engagement between the projection 21 and the hole 15 operates as a resilient detent to yieldably lock the telescope in its forward position; and the engagement of the projection 20 with the slot 13 assures a proper disposition of the telescope with respect to the chamber 10.

At the large or forward end of the chamber 10 we mount a fluorescent screen which preferably consists of a backing 22, of paper or the like, upon which a suitable fluorescent layer 23 is provided. This layer may be composed of a coating of any suitable or customary character, having the characteristic of fluorescing under the action of X-rays. The fluorescent screen is preferably held in position by mounting it within the beaded rim 24 in superposed relation to a protective disc or layer 25 which may be of "Bakelite", thin aluminum, or similar material which is impervious to ordinary light rays, yet pervious to X-rays. The large end of the chamber 10 constitutes an X-ray window, and the fluorescent layer 23 constitutes a fluorescent screen which is thus disposed behind the window.

The various parts fit together in a manner which makes the chamber 10 entirely light-tight, with respect to ordinary light rays. In the form illustrated, this is accomplished by the snug relationship between the telescopic tube 16 and the sheath 12, the sheath 12 serving as an opening at the rear end of the chamber with which the optical means, constituted of the telescope, is adapted to be associated in light-tight manner.

Within the telescope suitable lenses are arranged (not shown) in a manner which is well known per se and which renders the field of vision of the telescope observable to the operator whose eye is placed behind the eyepiece 19.

In Figure 5, we have shown a modified construction which has proven to be highly satisfactory, especially in the fluoroscopic examination of kidney stones or the like, or wherever a larger fluoroscopic screen is desirable. A light-tight chamber is again provided, having the forward wall 28 constituting the X-ray window, the rearwardly convergent side walls 29, and the rear narrowed housing 30. The walls 29 have a greater convergence than the walls of Figure 3, and the entire fluorescent screen 31 is brought into view by means of a telescope 32 whose objective 33 is of special construction, whereby a divergent field of vision, represented approximately by the numeral 34, is commanded. This enlarged field of vision is provided for by concaving the exposed portion of the objective lens, as indicated at 35.

In Figure 6, we have shown a construction wherein the rearwardly extending sheath 36, connected at its forward end to the rear end of the light-tight chamber, is permanently connected to the telescope. To accomplish this, we provide exterior threads 37 upon the telescope 38, and we provide a corresponding threaded portion 39 at the rear end of the sheath 36. A collar 40 preferably is provided on the telescope, and a set screw 41 holds the parts in mutually threaded engagement after they have been initially assembled during manufacture. The device of Figure 6 is completely sterilizable as a unit.

In the embodiment of Figures 1-4, or in any construction where the telescope is separably associated with the light-tight chamber, and hence with the fluorescent screen, the parts are capable of individual sterilization; and an added advantage is achieved in that the telescope may be replaced by another, or may be individually handled for purposes of repair or the like.

The manner in which the fluorescent screen is associated with the chamber, and mounted behind the window thereof, forms no material part of our invention; and under certain circumstances it may be desirable to mount the fluorescent screen in a removable manner with respect to the chamber. The layer 25, for example, together with a suitable rim, therefor, might be constructed as a removable cap capable of application and withdrawal from the open front end of the light-tight chamber.

The operation of the instrument will be obvious to those skilled in the art. If a beam of X-rays or the like is projected through the portion of the body to be examined, and if the X-ray window of the present device is then placed behind such body portion, in the path of the X-ray beam, the fluorescent screen will depict the shadows produced by the variable permeability of the different types of bone and tissue to the passage of X-rays. This effect is known per se to the profession, and has been resorted to for many years in the general art of fluoroscopy. The present invention serves in a convenient and compact manner to form an artificial dark room around and behind the fluorescent screen, and to transmit a rear view of the screen to a relatively remote point of observation.

The features which make our present instrument useful in a practical manner, where others have failed, lie in the symmetrical frustro-conical construction of the light-tight chamber, coupled with an optical means of greatly reduced calibre, whereby a rear view of the entire screen is capable of transmission to a remote point of observation without requiring the bulk which ordinary mirrors would call for. The wedge-shaped edge of the light-tight chamber permits it to be inserted into relatively inaccessible crevices and crannies. For example, in examining the teeth of the lower jaw, it is a relatively simple matter to insert the present chamber underneath the tongue, or between the tongue and the teeth. The instrument may also be used, with facility, in examining the front teeth of either the upper or lower jaws, this accomplishment being one which would be utterly impractical with a device of bulkier character. Furthermore, the acuteness of the angle of the wedge-shaped edge of the chamber may be varied to suit differing requirements, as is evidenced by a comparison of Figures 3 and 5; and where a wider field of vision is provided for there is a correspondingly greater ability to position the screen in relatively narrow and inaccessible places.

The use of a telescope has a further advantage in that it affords a degree of magnification which would not be otherwise achievable.

It is well known that X-rays are not reflected, and those rays which pass through the window of the present device will, therefore, continue rearwardly through the objective and out through the rear wall of the chamber. The head of the present observer is, therefore, not in the path of X-rays. However, as a precautionary measure, it is within the purview of my invention to construct the objective lens, and/or the other lenses of the device, of lead glass which bars the passage through it of X-rays. If desired, a screen or skirt of lead glass may also be mounted around the rear end of the telescope, or upon the rear end of the sheath, as a further and perfect safeguard against the exposure of any portion of the operator's head to X-rays.

While our invention is not restricted to any particular size of instrument, we wish to point out that the X-ray window of the device illustrated has a diameter of the order of one inch or so. The instrument is thus extremely compact and handy, and its utility and value will be obvious.

It will be understood that changes in the details, herein described and illustrated for the purpose of explaining the nature of our invention, may be made by those skilled in the art without departing from the spirit and scope of the invention as expressed in the appended claims. It is, therefore, intended that these details be interpreted as illustrative, and not in a limiting sense.

Having thus described our invention, and illustrated its use, what we claim as new and desire to secure by Letters Patent is—

1. A fluoroscope comprising a light-tight chamber with a front window pervious to X-rays and rearwardly converging side walls, a fluorescent screen behind said window, and optical means commanding a view of said screen from the rear narrow end of said chamber, said means transmitting said view to a laterally disposed remote point of observation.

2. A fluoroscope comprising a light-tight chamber with a front window pervious to X-rays and rearwardly converging side walls, a fluorescent screen behind said window, and optical means commanding a view of said screen from the rear narrow end of said chamber, said means transmitting said view to a laterally disposed remote point of observation, and means for separably associating said screen and optical means.

3. A fluoroscope comprising a light-tight chamber with a window pervious to X-rays and rearwardly converging side walls, a fluorescent screen behind said window, and a telescope having its objective in the rear narrow end of said chamber, said telescope extending laterally away from the chamber and serving to transmit a rear view of said screen to a point of observation at the remote end of the telescope.

4. A fluoroscope comprising a light-tight chamber with a window pervious to X-rays and rearwardly converging side walls, a fluorescent screen behind said window, a telescope having its objective in the narrow end of said chamber so as to command a rear view of said screen, said telescope extending laterally away from the chamber and serving to transmit said rear view to a point of observation at the remote end of the telescope, and means for separably associating said screen and telescope.

5. A fluoroscope comprising a light-tight chamber with a window pervious to X-rays and rearwardly converging side walls, a fluorescent screen behind said window, a telescope having its objective in the rear narrow end of said chamber so as to command a rear view of said screen, said telescope extending laterally away from the chamber and serving to transmit said rear view to a point of observation at the remote end of the telescope, and means for separably associating said screen and telescope, said means comprising a sheath carried by the chamber and adapted snugly to receive the telescope therein.

6. A fluoroscope comprising a light-tight chamber with a window pervious to X-rays and rearwardly converging side walls, a fluorescent screen behind said window, a telescope having its objective in the rear narrow end of said chamber so as to command a rear view of said screen, said telescope extending laterally away from the chamber and serving to transmit said rear view to a point of observation at the remote end of the telescope, a sheath carried by the chamber and encircling the forward end of the telescope, and means for interlocking the sheath and telescope in predetermined relationship.

7. A fluoroscope comprising a light-tight chamber with a window pervious to X-rays, a fluorescent screen behind said window, and a telescope having its objective end in communication with the rear of said chamber, the objective of said telescope commanding a forwardly divergent conical field of vision which serves to transmit a rear view of said screen to a point of observation at the remote end of the telescope, said objective lens having a concave exposed surface.

FREDERICK CHARLES WAPPLER.
ARTHUR FARBER.